A. GEDEON.
PIPE FITTING.
APPLICATION FILED JAN. 15, 1919.
1,325,783. Patented Dec. 23, 1919.
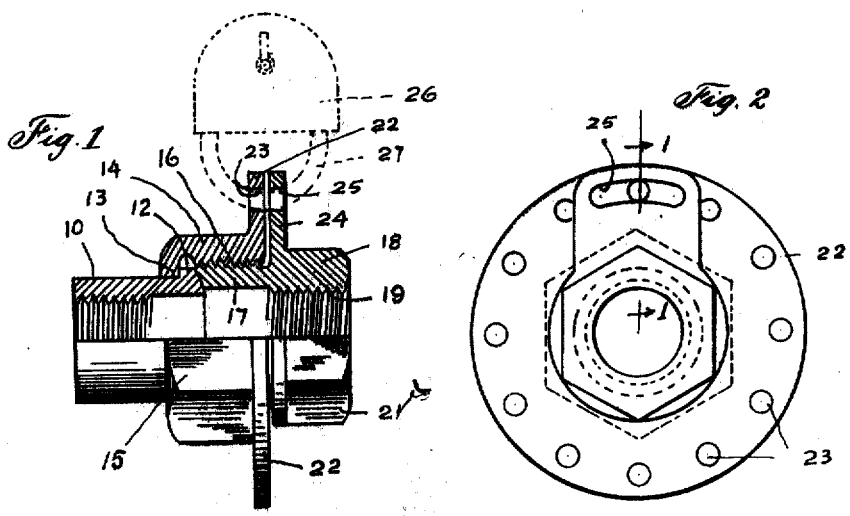
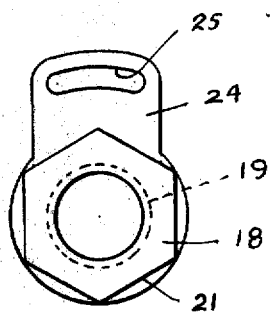
INVENTOR
Andreas Gedeon
by Robt Klotz
Atty.

UNITED STATES PATENT OFFICE.

ANDREAS GEDEON, OF CHICAGO, ILLINOIS.

PIPE-FITTING.

1,325,783. Specification of Letters Patent. Patented Dec. 23, 1919.

Application filed January 15, 1919. Serial No. 271,201.

*To all whom it may concern:*

Be it known that I, ANDREAS GEDEON, a citizen of the United States, residing at Chicago, in the county of Cook and State of Illinois, have invented certain new and useful Improvements in Pipe-Fittings, of which the following is a specification.

My invention relates to pipe fittings and has for its primary object the provision of an improvement in union connections for the ends of pipe whereby said connection, when made, can not be taken apart by unauthorized persons.

A further object is the provision of an improved union having means whereby the relatively rotatable parts thereof may be locked against disconnection in any given adjustment of those parts.

Other objects and advantages of my invention will appear from the following description, taken in conjunction with the accompanying drawings which form a part of this specification and illustrate the preferred embodiment of the invention.

In the drawings:

Figure 1 is a side elevation of the invention illustrating the upper half thereof in section on line 1—1 of Fig. 2.

Fig. 2 is an end elevation of the invention as viewed from the right in Fig. 1.

Fig. 3 is a similar end elevation of the nipple of the present invention as viewed from the right in Fig. 1.

Reference numeral 10 indicates a coupling member internally threaded in its outer end as at 11 for connection with a pipe and, at its inner end, carrying the ordinary outturned flange 12 by means of which it is secured to the in-turned flange 13 on the outer end of a collar 14.

Collar 14 is externally squared as at 15 for coöperation with the ordinary wrench and is interiorly threaded at its inner end 16 for engagement with the threaded inner end 17 of a nipple 18. Nipple 18 is provided in its outer end with internal threads 19 for engagement with the end of a pipe and is also squared exteriorly as at 21 for application of a wrench. An out-turned arm 22 is formed on the inner extremity of collar 14 and is provided with a plurality of annularly arranged apertures 23. Formed preferably integrally with nipple 18 is a radially extending arm 24 projecting from the inner end of the squared portion of the nipple adjacent to the externally threaded inner end 17. The arm 24 is provided with an arcuately attenuated slot 25 concentric with the common axis of the above described coupling member collar and nipple and, in its rotation, registering successively opposite the various apertures 23. Apertures 23 are so arranged and slot 25 is of such length, that the slot is always in register with one or more of the apertures 23.

In dotted lines in Fig. 1 is illustrated a pad-lock 26 having a hasp 27 passed through slot 25 and one of the apertures 23 in register therewith.

In the operation of my invention the coupling member 11 is threaded upon the end of one of two pipes to be connected and the outer end 19 of nipple 18 is threaded upon the alined end of the other pipe to be connected. Collar 14 is now threaded upon the inner end 17 of the nipple until the nipple and coupling member are drawn into intimate association. In this position of the parts arm 24 stands against or very close to the arm 22 and the hasp 27 of the pad-lock is locked through slot 25 and that aperture 23 in register therewith. It will be seen that unauthorized persons are thereby prevented from disconnecting the union so formed and that, while the arcuate slot 25 permits a slight degree of relative movement behind the nipple and collar, their casual disconnection is absolutely prevented.

While I have illustrated and described the preferred embodiment of my invention, it will be obvious that one skilled in the art may make modifications thereof without departing from the spirit of the invention. I wish therefore not to be restricted to the precise embodiment shown except in so far as the same is limited in the appended claims.

I claim:

1. In a union for pipes, the combination with a collar, and a laterally projecting flange fixed thereon, of a nipple in threaded engagement with said collar, and an arm laterally and rigidly projecting from the nipple, said flange being provided with a series of apertures equally spaced from each other and arranged annularly and concentric with the axis of the collar, and said arm being provided with an arcuate slot concentric with said axis adapted to register successively with said aperture, said slot being of such length that it stands at all times in register with some one of said apertures.

2. In a union for pipes, the combination with a collar, provided with an annularly arranged series of apertures spaced equidistantly from each other, of a nipple threaded thereinto and said arm being provided with an arcuate slot of such length as to stand in register with at least one of said apertures in any given relative position of the collar and nipple.

In testimony whereof I have affixed my signature.

ANDREAS GEDEON.